Feb. 14, 1933.　　　　J. W. H. RANDALL　　　　1,897,862
APPARATUS FOR PRODUCING LAMINATED GLASS
Filed Dec. 8, 1928　　　2 Sheets-Sheet 1
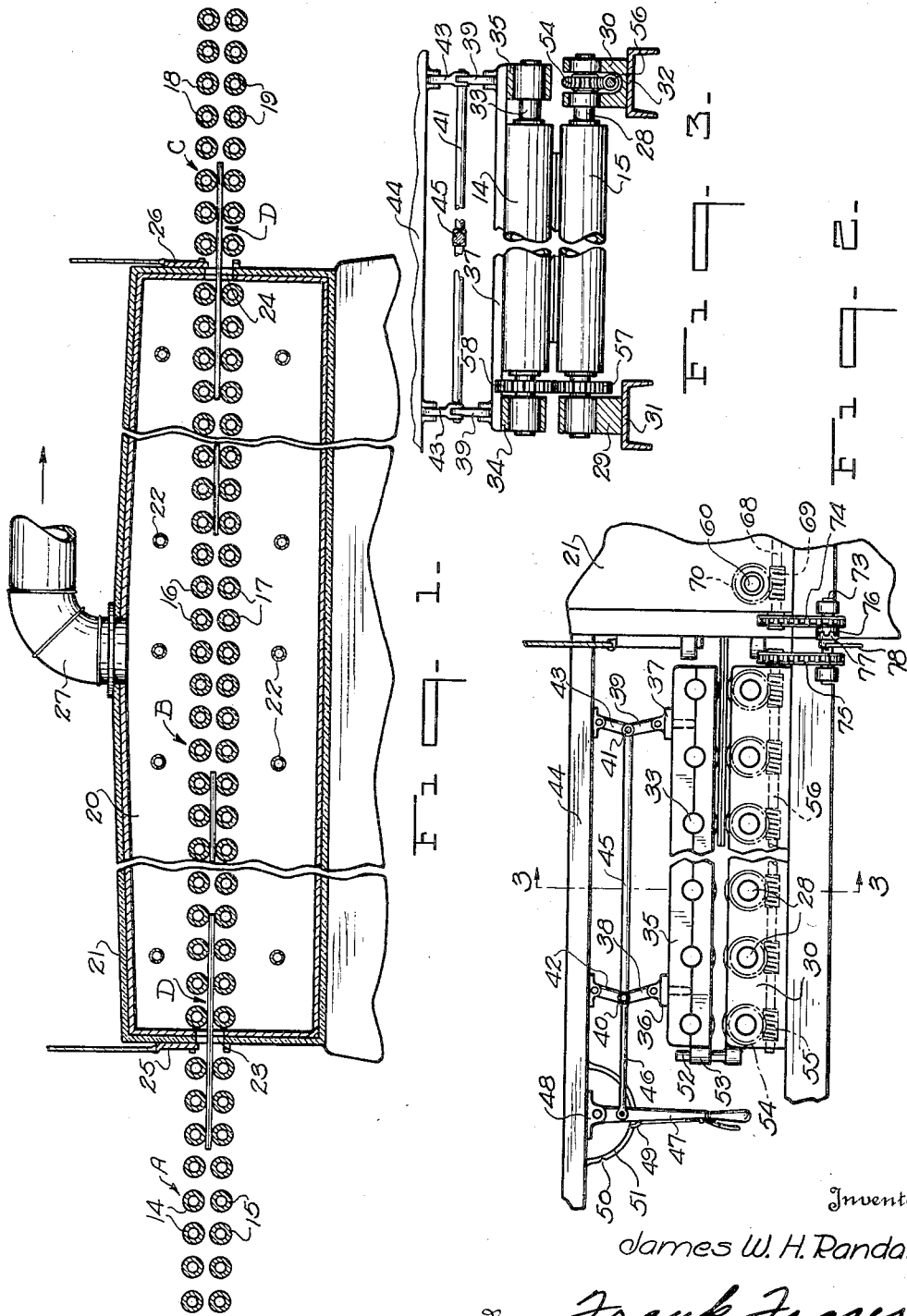
Inventor
James W. H. Randall.
By Frank Fraser
Attorney Feb. 14, 1933. J. W. H. RANDALL 1,897,862
APPARATUS FOR PRODUCING LAMINATED GLASS
Filed Dec. 8, 1928 2 Sheets-Sheet 2

Inventor
James W. H. Randall.
By Frank Fraser
Attorney

Patented Feb. 14, 1933

1,897,862

UNITED STATES PATENT OFFICE

JAMES W. H. RANDALL, OF NEW YORK, N. Y., ASSIGNOR TO LIBBEY-OWENS-FORD GLASS COMPANY, OF TOLEDO, OHIO, A CORPORATION OF OHIO

APPARATUS FOR PRODUCING LAMINATED GLASS

Application filed December 8, 1928. Serial No. 324,730.

This invention relates broadly to the manufacture of laminated or composite glass and has for its primary object the provision of an improved method of and apparatus for producing laminated glass by a so-called continuous operation.

Another object of the invention is the provision of such a method and apparatus wherein the uniting of the assembled laminations to form a composite sheet is effected while the said laminations are in motion and more particularly as they are being advanced between a series of rotatable pressing elements. Another object resides in the utilization of means for creating a vacuum in surrounding relation to the laminations during the uniting thereof whereby the exhaustion or removal of air and any excess liquid solvent from therebetween may be achieved in a rapid and effective manner and the uniting or pressing operation facilitated. A further object is the provision of novel means for initially receiving the assembled laminations to be joined and for advancing them to the pressing elements. Also, the invention contemplates means for receiving the composite sheet from the pressing elements and by means of which the said sheet may be cooled under pressure, if desired, and while in motion.

Other objects and advantages of the invention will become more apparent during the course of the following description when taken in connection with the accompanying drawings.

In the drawings forming a part of this application and wherein like numerals are employed to designate like parts throughout the same, Fig. 1 is a vertical longitudinal section through apparatus provided by the present invention.

Fig. 2 is a side elevation of the means for initially receiving the assembled sheets of material to be joined.

Fig. 3 is a transverse section taken substantially on line 3—3 of Fig. 2.

Figure 7:
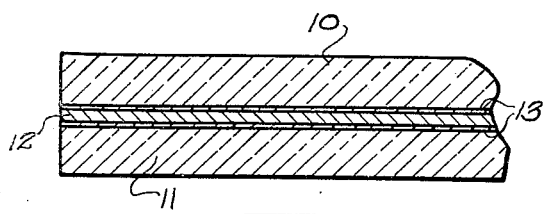
Fig. 7 is a sectional view of a portion of a finished laminated or composite sheet.

Referring now to the drawings, there is illustrated in Fig. 7 a finished sheet of laminated or composite glass which, as herein shown, comprises the two outer sheets of glass 10 and 11 and an intermediate sheet of non-brittle material 12. Arranged between each glass sheet and the sheet of non-brittle material is a film or skin 13 of some suitable binding medium which is adapted to aid in the uniting of the several sheets or laminations when they are subjected to the action of heat and pressure. Although the laminated sheet illustrated consists of but two sheets of glass and a single sheet of non-brittle material, a greater number of glass sheets and sheets of non-brittle material may be used as desired. The present invention concerns broadly the manufacture of glass of this general type and more particularly to an improved method of and apparatus for uniting the several laminations.

The apparatus, by means of which the present methods herein contemplated may be practiced, might take a variety of different forms but one construction has been illustrated by way of example and as shown in Fig. 1 consists essentially of a series of rotatable members or rolls between which the assembled sheets of material are adapted to be passed. More specifically, the letter A generally designates the roller section for initially receiving the assembled sheets of material to be joined, B the roller section wherein the sheets are adapted to be united and C the roller section for receiving the composite sheet from section B and cooling the same to the desired temperature.

The receiving section A comprises the upper and lower rotatable members or rolls 14 and 15, pressing section B the upper and lower rotatable members or rolls 16 and 17, and cooling section C the upper and lower rotatable members or rolls 18 and 19. The upper and lower rolls respectively of the sections A, B and C are arranged in substantial horizontal alignment and the upper and lower rolls of each section are arranged directly one above the other. The assembled sheets of material to be joined, and which are herein designated generally D are adapted to be continuously moved between the upper and lower rolls of the several roller sections from the receiving section A to the cooling section C. That is, the assembled sheets are adapted to be initially positioned between the rolls 14 and 15 of receiving section A and upon rotation of said rolls are adapted to be moved to the right between the rolls 16 and 17 of the pressing section B. From the section B, the composite sheet is passed between the rolls 18 and 19 of cooling section C.

The rolls 16 and 17, which constitute rotatable pressing elements, are mounted within a housing 20 preferably covered with a suitable insulating material 21 and heated internally by means of a plurality of heating elements 22 arranged above and beneath the rolls. These heating elements may be of any desired character such as steam pipes extending transversely of the housing or electrical heating units. The opposite ends of housing 20 are provided with openings 23 and 24 controlled by gates 25 and 26 respectively. Communicating with the housing, preferably through the top thereof, is a conduit 27 having connection with a suitable vacuum pump, not shown, but which may be of any conventional or preferred construction.

In the operation of the apparatus as thus far descrbed, after the assembled sheets of material to be joined are passed from between the receiving rolls 14 and 15 into the housing 20 between the rolls 16 and 17 therein, the gates 25 and 26 at opposite ends of said housing are adapted to be closed and the vacuum or exhausting pump, not shown, placed in operation so as to exhaust the air from and create a vacuum within the housing 20 in surrounding relation to the assembled sheets D. As the assembled sheets are moved through the housing by and between the rolls 16 and 17, the said rolls are adapted to exert sufficient pressure thereupon which, coupled with the heating of the sheets, will effect the uniting thereof to form a composite or laminated sheet. The heating of the sheets is accomplished by the heating elements 22 and in addition, the pressing rolls 16 and 17 are preferably hollow so that they may be internally heated.

After the sheets or laminations have been joined and the composite sheet reaches the right hand end of the housing 20, the exhausting pump, not shown, may be stopped and the gate 26 opened to permit the passage of the sheet from the housing between the cooling rolls 18 and 19 while, at the same time, the gate 25 can be opened and a new set of sheets to be joined passed into the housing through the opening 23. Of course, it is possible to so construct the gates 25 and 26 that the sheets can be passed into and out of the housing 20 without the necesity of stopping the vacuum pump. That is, the vacuum may be continuously maintained within the housing at all times. The rolls 18 and 19 are preferably hollow and internally cooled so as to effect a cooling down of the sheets to the desired handling temperature. If preferred, the pressure exerted upon the sheets by the rolls 18 and 19 may be the same as the pressure of the rolls 16 and 17 so that the composite sheet may be cooled under pressure and while in motion. On the other hand, the pressure of the rolls 18 and 19 on the sheets can be greater or less than the pressure of the pressing rolls 16 and 17.

The creating of a vacuum in surrounding relation to the sheets during the uniting thereof contains several distinct advantages in that the exhaustion of the air from the housing will permit the rapid exhaustion of solvent vapors therefrom and will also render the removal of air and excess liquid solvent from between the laminations more effective. Further, it will both facilitate and expedite the pressing operation. The removal of air and excess liquid solvent from between the laminations is highly desirable and in fact is believed essential to the production of good quality laminated glass.

As illustrated in Figs. 2 and 3, the lower rolls 15 of receiving section A are mounted upon shafts 28 journaled at their opposite ends in bearings 29 and 30 supported upon fixed channel beams 31 and 32. The upper rolls 14 of said section are carried by shafts 33 journaled at their opposite ends in bearings 34 and 35 connected by the spaced cross members 36 and 37. The upper rolls 14 are adapted to be raised and lowered as a unit relative to the lower rolls 15 to facilitate the placing of the assembled sheets of material to be joined in position therebetween. While any desired means may be utilized for accomplishing this purpose, the construction shown comprises pairs of links 38 and 39 pivotally connected at their lower ends with the cross members 36 and 37, adjacent the opposite ends thereof, and having a pivotal mounting with the transverse shafts 40 and 41 respectively. Also, having a pivotal mounting with these shafts are the pairs of links 42 and 43 pivoted at their upper ends to a fixed supporting frame or the like 44. The shafts 40 and 41 are connected intermediate their ends by a rod 45 and pivotally associated with shaft 40 is a rod 46 pivoted at its outer end to an operating lever 47. This lever is pivoted as at 48 to the frame 44 and carries a pawl 49 adapted to be received in notches 50 in the segment 51 also carried by frame 48. When the rolls 14 are in their lowered position, the parts of the apparatus assume the position indicated in Fig. 2. When the rolls are adapted to be raised, however, the lever 47 is swung to the left so as to cause a folding or collapsing of the links 38, 42 and 39, 43 in accordance with the well known principle of the toggle joint. When the links are folded in this manner, the rolls 14 will be raised as a unit and by engaging the pawl 49 in notch 50 at the left of segment 51, the rolls can be maintained in a raised position while the assembled sheets of material to be joined are placed in position upon rolls 15. In order to guide the rolls 14 during the raising and lowering thereof, one or a plurality of guide pins 52 may be carried by bearings 29 and 30 and received through guide lugs 53 carried by bearings 34 and 35. After the sheets have been placed between the rolls 14 and 15, the rolls 14 are lowered and the said rolls 14 and 15 are then adapted to be driven to advance the sheets forwardly into the housing 20. To this end, the shaft 28 of each of the lower rolls is provided at one end with a worm gear 54 meshing with a worm 55 carried by line shaft 56, this line shaft being driven in a manner to be more fully hereinafter described. The upper rolls 15 are driven from the lower rolls through the intermeshing gears 57 and 58.

Figure 4:
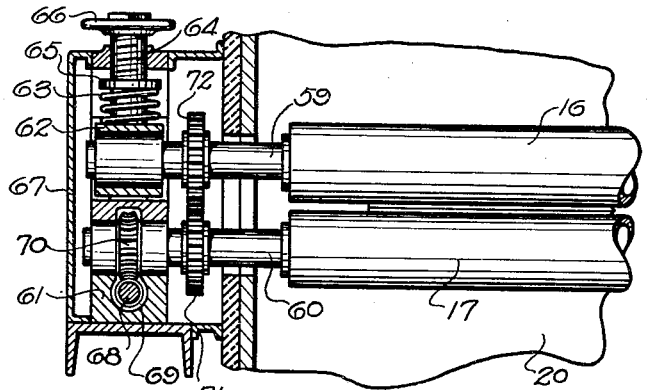
Fig. 4 is a detail transverse section showing the mounting and driving means for the pressing elements or rolls.

The mounting and drive for the pressing elements or rolls 16 and 17 is illustrated particularly in Fig. 4. These rolls are mounted upon shafts 59 and 60 respectively, the shaft 60 being journaled at either end in a fixed bearing 61 while the shaft 59 is journaled at either end in a movable bearing 62 normally urged toward the fixed bearing by a compression spring 63. By the provision of such an arrangement, the upper rolls are yieldably urged toward the lower rolls. The spring 63 encircles the lower end of an adjusting screw 64 and bears at one end against a collar 65 carried thereby and at the opposite end against the bearing 62. By adjusting the screws 64, the pressure of the upper rolls can be varied as desired, the rotation of each screw being facilitated by the provision of a hand wheel 66. The bearings 61 and 62 are adapted to be contained in a chamber 67 which is sealed to maintain the vacuum within the housing 20.

Arranged longitudinally along one side of the housing 20, within the sealed chamber 67, is a line shaft 68 carrying a plurality of worms 69 which mesh with worm gears 70 carried by shafts 60 of rolls 17. Upon rotation of the line shaft 68 all of the rolls 17 will be driven at a uniform and constant speed and the upper rolls 16 are driven from the lower rolls through the intermeshing gears 71 and 72. The mounting and drive for the rolls 18 and 19 of cooling section C are adapted to be the same as just described in connection with rolls 16 and 17.

The line shaft 68, pressing rolls 16 and 17 and cooling rolls 18 and 19 are adapted to be driven continuously while the line shaft 56 and receiving rolls 14 and 15 are preferably driven intermittently, it being apparent that the latter rolls need not be driven, if desired, during the positioning of the sheets to be joined therebetween. To effect this intermittent rotation of the line shaft 56 from line shaft 68, there is mounted at one side of the apparatus an intermediate auxiliary shaft 73 driven from the line shaft 68 through a chain drive 74 and in turn driving line shaft 56 through a second chain drive 75. Loosely mounted upon shaft 73 is a sprocket, not shown, about which the sprocket chain 74 is trained and which carries a clutch section 76. Slidably keyed to the shaft 73 is a clutch section 77 movable into and out of engagement with clutch section 76 by a lever or the like 78. Thus, upon engagement of the clutch section 77 with clutch section 76, the shaft 73 will be driven whereby to effect rotation of the line shaft 56 and receiving rolls 14 and 15. On the other hand, when the clutch section 77 is moved to disengage clutch section 76, the rotation of shaft 73 and line shaft 56 will be stopped. While the feed rolls 14 and 15 have been described as being driven intermittently, they may of course be driven continuously if preferred.

Figure 5:
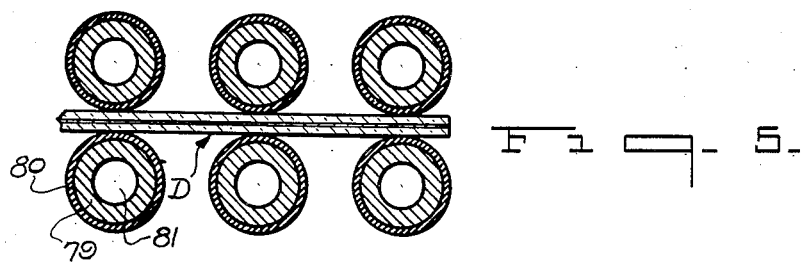
Fig. 5 is a sectional view showing one type of pressing element or roll which may be used.
Figure 6:
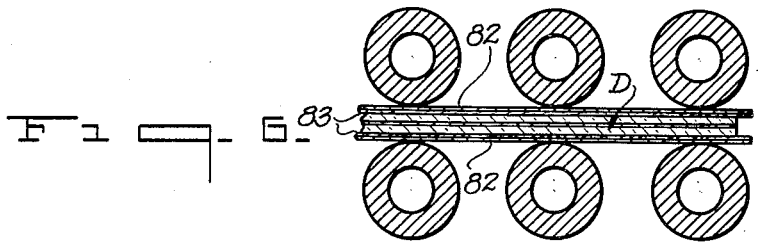
Fig. 6 is a similar view showing a different type of pressing roll.

In Fig. 5 is illustrated one type of roll which may be used and which comprises an inner metallic core 79 having a covering of rubber or the like 80, the roll being preferably provided with a central bore 81 through which may be circulated a suitable temperature control medium. Also, a polished steel roll such as illustrated in Fig. 6 may be employed and when such a roll is used, it is desirable, when passing the sheets to be joined therebetween, that there be arranged outwardly of each sheet of glass a plate 82 of soft metal such as aluminum or the like and inwardly of this plate a sheet of blotting paper or the like 83 which contacts with the glass sheet. When the rubber covered rolls illustrated in Fig. 5 are used, however, the aluminum plates and blotting paper can be dispensed with.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

I claim

1. In apparatus for producing laminated glass, a series of rotatable pressing elements between which the assembled sheets of material to be joined are adapted to be passed, and means for maintaining a vacuum in surrounding relation to the sheets during their passage between said pressing elements.

2. In apparatus for producing laminated glass, a series of heated rotatable pressing elements between which the assembled sheets of material to be joined are adapted to be passed, and a second series of cooled rotatable elements for receiving the sheets therebetween from the pressing elements.

3. In apparatus for producing laminated glass, a series of heated rotatable pressing elements between which the assembled sheets of material to be joined are adapted to be passed, means for maintaining a vacuum in surrounding relation to the sheets during their passage between the pressing elements, and a second series of cooled rotatable elements for receiving the sheets therebetween from the pressing elements.

4. In apparatus for producing laminated glass, a series of superposed rotatable pressing elements adapted to receive therebetween the assembled sheets of material to be joined, a housing for the pressing elements, means for creating a vacuum within the housing, and means for heating said housing.

5. In apparatus for producing laminated glass, a series of superposed heated rotatable pressing members adapted to receive therebetween the assembled sheets of material to be joined, a housing for the pressing members, means for creating a vacuum within the housing, and a second series of superposed cooled rotatable members for receiving the sheets therebetween from said pressing members.

6. In apparatus for producing laminated glass, a roller section comprising a plurality of upper and lower rotatable members adapted to be received therebetween the assembled sheets of material to be joined, means for raising and lowering the upper members as a unit relative to the lower members to facilitate the positioning of the assembled sheets therebetween, means for driving said members to advance the sheets forwardly, and means for receiving the sheets from the roller section and effecting the uniting thereof.

7. In apparatus for producing laminated glass, a roller section comprising a plurality of upper and lower rotatable members adapted to be received therebetween the assembled sheets of material to be joined, means for raising and lowering the upper members as a unit relative to the lower members to facilitate the positioning of the assembled sheets therebetween, means for driving said members to advance the sheets forwardly, and a series of rotatable pressing members adapted to receive the sheets therebetween from the roller section and to effect the uniting thereof.

8. In apparatus for producing laminated glass, a roller section comprising a plurality of upper and lower rotatable members adapted to be received therebetween the assembled sheets of material to be joined, means for raising and lowering the upper members as a unit relative to the lower members to facilitate the positioning of the assembled sheets therebetween, means for driving said members to advance the sheets forwardly, a series of heated rotatable pressing members for receiving the sheets therebetween from the roller section, a housing for said members, means for creating a vacuum within the housing, and a series of cooled rotatable members for receiving the sheets therebetween as they issue from said housing.

9. In apparatus for producing laminated sheet glass, heated movable means for supporting and conveying the assembled sheets of material to be joined in a definite substantially horizontal path and for subjecting the same during such travel thereof to a pressure sufficient to effect a uniting of the said sheets, and cooled movable means for receiving the united sheets from said heated means and maintaining a pressure thereupon.

Signed at New York, in the county of New York and State of New York, this first day of December, 1928.

JAMES W. H. RANDALL.